(12) United States Patent
Lu et al.

(10) Patent No.: US 8,175,264 B2
(45) Date of Patent: May 8, 2012

(54) ENCRYPTION AND DECRYPTION PROCESSING METHOD, SYSTEM AND COMPUTER-ACCESSIBLE MEDIUM FOR ACHIEVING SMS4 CRYPTOGRAPHIC PROCEDURE

(75) Inventors: Jiayin Lu, Shaanxi Province (CN); Jun Cao, Shaanxi Province (CN); Xiang Yan, Shaanxi Province (CN); Zhenhai Huang, Shaanxi Province (CN)

(73) Assignee: China Iwncomm Co., Ltd., Shannxi Province (CN)

( * ) Notice: Subject to any disclaimer, the term of this patent is extended or adjusted under 35 U.S.C. 154(b) by 918 days.

(21) Appl. No.: 12/281,144

(22) PCT Filed: Feb. 27, 2007

(86) PCT No.: PCT/CN2007/000617
§ 371 (c)(1),
(2), (4) Date: Aug. 28, 2008

(87) PCT Pub. No.: WO2007/098687
PCT Pub. Date: Sep. 7, 2007

(65) Prior Publication Data
US 2010/0232597 A1   Sep. 16, 2010

(30) Foreign Application Priority Data
Mar. 2, 2006   (CN) .......................... 2006 1 0041863

(51) Int. Cl.
H04K 1/00   (2006.01)
(52) U.S. Cl. ................. 380/28; 380/29; 380/37
(58) Field of Classification Search .................... 380/28, 380/29, 37
See application file for complete search history.

(56) References Cited

U.S. PATENT DOCUMENTS

| | | | |
|---|---|---|---|
| 6,324,286 B1 * | 11/2001 | Lai et al. | 380/29 |
| 6,760,439 B1 * | 7/2004 | Windirsch | 380/37 |
| 6,937,727 B2 * | 8/2005 | Yup et al. | 380/37 |
| 7,430,293 B2 * | 9/2008 | Elbe et al. | 380/44 |
| 2004/0224704 A1 | 11/2004 | Islam et al. | |

FOREIGN PATENT DOCUMENTS

| | | |
|---|---|---|
| CN | 1408187 | 2/2003 |
| CN | 1610291 A | 4/2005 |
| CN | 1653746 | 10/2005 |
| EP | 1567944 | 8/2005 |
| JP | 2004-310730 | 11/2004 |
| WO | WO 03/096615 A1 | 11/2003 |

(Continued)

OTHER PUBLICATIONS

English language International Search Report for International Application No. PCT/CN2007/000617 filed Feb. 27, 2007.

(Continued)

*Primary Examiner* — Krista Zele
*Assistant Examiner* — James Forman
(74) *Attorney, Agent, or Firm* — Dorsey & Whitney LLP (57) ABSTRACT

An encryption and decryption processing method, system and computer-accessible medium for achieving SMS4 cryptographic procedure/algorithm can be provided. First, constant arrays can prepared, the external data are input into a data registering unit and the first data conversion is addressed. Secondly, the second data conversion is addressed. Thirdly, the second data conversion is repeated until completing all the prescribed data conversion. Then, the results of repeating encryption and decryption processing are achieved.

8 Claims, 3 Drawing Sheets

FOREIGN PATENT DOCUMENTS

WO    WO 2004/042603    5/2004

OTHER PUBLICATIONS

Japanese Office Action dated Aug. 18, 2011 for Japanese Patent Application No. JP 2008-556637.

"SMS4 Encryption Algorithm for Wireless Networks," Feb. 2006.
Akashi Satoh et al., "High-Speed Triple-DES Hardware Implementation on ASIC," Computer Security System Symposium 2004, vol. II, pp. 607-612, Aug. 20, 2004.

* cited by examiner

ENCRYPTION AND DECRYPTION PROCESSING METHOD, SYSTEM AND COMPUTER-ACCESSIBLE MEDIUM FOR ACHIEVING SMS4 CRYPTOGRAPHIC PROCEDURE

CROSS REFERENCE TO RELATED APPLICATION(S)

This application is a national stage application of International Application No. PCT/CN2007/000617 which was filed on Feb. 27, 2007, and published on Sep. 7, 2007 as International Publication No. WO 2007/098687 (the "International Application"). This application claims the priority from the International Application pursuant to 35 U.S.C. §365, and from Chinese Patent Application No. 200610041863.9 filed on Mar. 2, 2006, under 35 U.S.C. §119. The disclosures of the above-referenced applications are incorporated herein by reference in their entireties.

FIELD OF THE INVENTION

The present invention relates to the field of information technologies, and in particular, to a method, system and computer-accessible medium for encryption and decryption processing in SMS4 cryptographic procedure.

BACKGROUND INFORMATION

Important components in implementing SMS4 cryptographic procedure (or algorithm) include a key expansion unit and an encryption and decryption unit, the internal structures and processing processes of which are basically the same or very similar. The encryption and decryption unit can consist of three parts, e.g., a data registering unit, a constant array storing unit and a data converting unit.

The data registering unit generally consists of a general trigger for registering data. The data registered in the unit can be unchanged within a clock period. The general trigger can be a data temporary storage component where the data of a data input end is sent to an output end of the trigger at a rising clock edge or a falling clock edge, while the data of the trigger output end may be unchanged at other time.

The constant array storing unit can be a storing unit for storing a constant array. The convention constant array may be generally a data array with 32-bit width and 32-bit depth prepared before encryption and decryption processing. The data in the constant array storing unit can be arranged in a descending sequence of addresses, and named as rk0, rk1 . . . rk31.

The data converting unit can be a unit for data processing according to the cryptographic procedure or algorithm. For example, in the data processing according to the National SMS4 cryptographic procedure/algorithm, the operation performed by the data converting unit only includes one conversion specified in the cryptographic procedure/algorithm.

Conventionally, the encryption and decryption data processing method according to SMS4 cryptographic procedure/algorithm may be as follows:

1) inputting external data into the data registering unit; in particular, data are outputted from the output end of the data registering unit after the external data are inputted into the data registering unit; for example, the external data of 128 bits may be divided into four data blocks with each including 32 bits, and named as A0, A1, A2 and A3, respectively; the data outputted from the output end of the data registering unit are still in 128 bits, which may be divided into four data blocks with each including 32 bits, and named as a0, a1, a2 and a3, respectively;

2) providing a data conversion processing, with the data from the output end of the data registering unit being inputted into the data converting unit for data conversion processing; for example, the data a0, a1, a2 and a3 from the output end of the data registering unit may be converted into 128-bit data C0, C1, C2 and C3 via the data converting unit;

3) providing a second data conversion processing, with the data after the previous data conversion processing being stored into the data registering unit again, then the data from the output end of the data registering unit can be inputted the data converting unit again for a second data conversion processing; and 4) repeating the second data conversion processing for obtaining the final data processing result.

For external data with 128 bits, the second data conversion processing may be repeated 30 times, e.g., the data conversion processing shall be made 32 times in all for obtaining the final data processing result.

In the conventional systems and methods described above, a constant array with 32-bit width and 32-bit depth is generally prepared before the encryption and decryption processing, and the data converting unit performs only one conversion operation specified in the cryptographic algorithm, as a result, the data conversion processing shall be repeated many times. For example, in order to encrypt 128-bit data using such conventional systems and methods, the data conversion processing generally has to be repeated 32 times for obtaining the final data processing result.

Furthermore, the encryption and decryption efficiency of the conventional systems and methods described above is generally low. The encryption efficiency is the data amount encrypted in unit time. For example, the data conversion processing is likely repeated 32 times for encrypting 128-bit data. Due to the generally-low clock frequency in current practical applications, the amount of data encrypted in unit time may be less, and the efficiency can be low. If the encryption efficiency is specified, the clock frequency should be increased. However, in the practical applications, the clock frequency may be difficult to increase. Therefore, the actual encryption efficiency is still low. The increase of the clock frequency likely further causes difficulties in design and implementation of the integrated circuit, and a poor signal integrity and a higher design cost. Furthermore, the integrated circuit designed according to the conventional systems which utilize the conventional methods, may also result in the increasing of cost of a Printed Circuit Board (PCB), and the difficulties in designing the PCB and product implementation; additionally, great interferences may be present in the system, which impacts on the normal and high-efficiency work of other equipments and devices.

SUMMARY OF EXEMPLARY EMBODIMENTS OF THE INVENTION

An exemplary embodiment of the present invention provides method, system and computer-accessible medium for encryption and decryption processing in SMS4 cryptographic procedure or algorithm, which are configured to reduce repeating times of data conversion processing and improves encryption efficiency.

For example, the exemplary embodiment of the present invention can provide a method for encryption and decryption processing in SMS4 cryptographic procedure/algorithm which can comprise a repeating encryption and decryption data processing. In addition, the exemplary embodiment of the method can include arranging data width and depth of a first constant array and storing the first constant array, outputting registered external data at the rising edge or falling edge of a first clock period, and providing a data conversion processing for a first data in a first row of the stored first constant array with the registered external data in the first clock period to obtain a first conversion data of the first clock period. Further, the exemplary embodiment of the method can comprise providing a data conversion processing for a second data in the first row of the stored first constant array with the first conversion data of the first clock period to obtain a second conversion data of the first clock period, and by analogy, providing a data conversion processing for all the rest data in the first row of the stored first constant array in sequence to obtain conversion-processing data of the first clock period.

Additionally, the exemplary embodiment of the method can comprise registering the conversion-processing data of the first clock period at the rising edge or falling edge of a second clock period, providing a data conversion processing for a first data in a second row of the stored first constant array with the registered conversion-processing data of the first clock period in the second clock period to obtain a first conversion data of the second clock period; providing a data conversion processing for a second data in the second row of the stored first constant array with the first conversion data of the second clock period to obtain a second conversion data of the second clock period, further, by analogy, providing a data conversion processing for all the rest data in the second row of the stored first constant array in sequence to obtain conversion-processing data of the second clock period, and repeating the data conversion processing process until completing the data conversion processing processes, the number of which equals the value of the depth, thereby obtaining a final result of the repeating encryption and decryption processing.

According to a further exemplary embodiment of the present invention, the first constant array can include data that are arranged in a descending sequence of addresses and stored, and width and depth of the data of the first constant array can be arranged based on the number of the data conversion processing, and the product of the width and the depth may be, e.g., about 1024.

According to another exemplary embodiment of the present invention, before the repeating encryption and decryption data processing, a first additional encryption and decryption data processing procedure can be utilized. The first additional encryption and decryption data processing procedure can include:
  (i) arranging the data width of a second constant array according to the number of the data conversion processing in the step of the first additional encryption and decryption data processing, the data depth of the second constant array being 1 and storing the second constant array, and (ii) outputting the registered external data at a rising edge or falling edge of the clock period;
  (ii) providing a data conversion processing for a first data in the stored second constant array with the registered external data in this clock period to obtain a first conversion data;
  (iii) providing a data conversion processing for a second data in the stored second constant array with the first conversion data to obtain a second conversion data; and
  (iv) by analogy, providing a data conversion processing for all the rest data in the stored second constant array in sequence in the step of the first additional encryption and decryption data processing to obtain a result of the first additional encryption and decryption data processing, which serves as the external data in the repeating encryption and decryption data processing.

According to still another exemplary embodiment of the present invention, the first constant array and the second constant array, as the case may be, can provide as follows: the data width of the second constant array equals the product of the number of data conversions in the first additional encryption and decryption data processing and about, e.g., 32; the data depth of the second constant array is, e.g., 1; the product of the data width and depth of the second constant array is determined; and the sum of the product of the data width and depth of the second constant array and the product of the data width and depth of the first constant array is, e.g., 1024.

For example, after the repeating encryption and decryption data processing, a second additional encryption and decryption data processing can be further included, which can comprise:
  (i) arranging the data width of a third constant array according to the number of the data conversion processing in the step of the second additional encryption and decryption data processing, the data depth of the third constant array being, e.g., 1, and storing the third constant array;
  (ii) registering the result of the repeating encryption and decryption data processing, and output the registered data at the rising edge or falling edge of a clock period;
  (iii) providing a data conversion processing for a first data in the stored third constant array with the registered external data in this clock period to obtain a first conversion data;
  (iv) providing a data conversion processing for a second data in the stored third constant array with the first conversion data to obtain a second conversion data; and
  (v) by analogy, providing a data conversion processing for all the rest data in the stored third constant array in sequence in the step of the second additional encryption and decryption data processing to obtain a result of the second additional encryption and decryption data processing which serves as a final encryption and decryption data processing result.

In yet another exemplary embodiment of the present invention, the first constant array, the second constant array and the third constant array, as the case may be, can provide the following:
  (i) the data width of the second constant array equals the product of the number of data conversions in the step of the first additional encryption and decryption data processing and, e.g., 32; the data depth of the second constant array is, e.g., 1; and the product of the data width and depth of the second constant array is determined;
  (ii) the data width of the third constant array equals the product of the number of data conversions in the step of the second additional encryption and decryption data processing and 32; the data depth of the third constant array is 1; and the product of the data width and depth of the third constant array is determined; and
  (iii) the sum of the product of the data width and depth of the second constant array, the product of the data width and depth of the third constant array, and the product of the data width and depth of the first constant array is, e.g., 1024.

According to still a further exemplary embodiment of the present invention, after the repeating encryption and decryption data processing, a second additional encryption and decryption data processing may be further included, which can comprise:

(i) arranging the data width of a third constant array according to the number of the data conversion processing in the step of the second additional encryption and decryption data processing, where the data depth of the third constant array is 1 and storing the third constant array;

(ii) registering the result of the repeating encryption and decryption data processing, and output the registered data at the rising edge or falling edge of a clock period;

(iii) providing a data conversion processing for a first data in the stored third constant array with the registered external data in this clock period to obtain a first conversion data;

(iv) providing a data conversion processing for a second data in the stored third constant array with the first conversion data to obtain a second conversion data; and (v) by analogy, providing a data conversion processing for all the rest data in the stored third constant array in sequence in the step of the second additional encryption and decryption data processing to obtain a result of the second additional encryption and decryption data processing which serves as a final encryption and decryption data processing result.

For example, the first constant array and the third constant array can provide that (i) the data width of the third constant array equals the product of the number of data conversions in the step of the second additional encryption and decryption data processing and, e.g., 32; the data depth of the third constant array is, e.g., 1; the product of the data width and depth of the third constant array is determined; and the sum of the product of the data width and depth of the third constant array, and the product of the data width and depth of the first constant array is, e.g., 1024.

In another exemplary embodiment of the present invention, a computer-accessible medium can be provided for encryption and decryption processing in SMS4 cryptographic procedure/algorithm (e.g., a storage device/arrangement that can store software thereon, which, when executed by a processor, configures such processor or another processor to perform the exemplary procedures according to the present invention as described herein above). The storage device/arrangement can include a hard disk, removable storage device, RAM, ROM, multiple such devices, etc.

In addition, an exemplary embodiment of a system for encryption and decryption processing in SMS4 cryptographic procedure/algorithm can comprise, e.g., a repeating encryption and decryption data processing device which may include a first constant array storing unit, a first data registering unit and a first data converting unit, whereas the first data converting unit can include a plurality of N-data converting sub-units. For example, the first constant array storing unit can be configured to store a first constant array, and transmit, respectively, each row of data in the first constant array in sequence to the plurality of N-data converting sub-units of the first data converting unit in each clock period. The first data registering unit can be configured to register data, deliver the registered data from an input end to an output end at the rising edge or falling edge of each clock period, and output the data to a first data converting sub-unit in each clock period. The plurality of N-data converting sub-units can be configured to provide a data conversion processing in sequence in each clock period, and output the obtained conversion data to a next data converting sub-unit for subsequent processing, until completing the data conversion processing processes, the number of which equals the value of the depth, thereby obtaining a result of the repeating encryption and decryption data processing.

For example, the first constant array can be such that the width and depth of data are arranged based on the number of the data converting sub-units, N, and the product of the width and the depth is 1024. Further, the data may be arranged in a descending sequence of addresses.

According to an exemplary embodiment of the present invention, a first additional encryption and decryption data processing device can also be provided. The device can include a second constant array storing unit, a second data registering unit and a second data converting unit, whereas the second data converting unit may include a plurality of M-data converting sub-units. For example, the second constant array storing unit can be configured to store a second constant array, and output respectively each row of data in the second constant array in sequence to the plurality of M-data converting sub-units of the second data converting unit in each clock period. The second data registering unit can be configured to register data, deliver the registered data from an input end to an output end at the rising edge or falling edge of each clock period, and output the data to a second data converting sub-unit in each clock period. The plurality of M data converting sub-units can be configured to provide a data conversion processing in sequence in each clock period, and output the obtained conversion data to a next data converting sub-unit for subsequent processing, until completing the data conversion processing processes, the number of which can equal the value of the depth, thereby obtaining a result of a first additional encryption and decryption data processing, which can serve as the registered data in the repeating encryption and decryption data processing.

According to still another exemplary embodiment of the present invention, the first constant array and the second constant array can provide that the data width and depth of the second constant array may be arranged based on the number of the data converting sub-units, M, in the first additional encryption and decryption data processing device; the data width of the second constant array may equal the product of the number of the data converting sub-units, M, in the first additional encryption and decryption data processing device and 32; the data depth of the second constant array is, e.g., 1; and the product of the data width and depth of the second constant array is, e.g., M×32×1. In addition, the sum of the product of the data width and depth of the second constant array, e.g., M×32×1, and the product of the data width and depth of the first constant array is, e.g., 1024.

For example, a second additional encryption and decryption data processing device can also be provided. The device may include a third constant array storing unit, a third data registering unit and a third data converting unit, whereas the third data converting unit can include a plurality of Q data converting sub-units. In particular, the third constant array storing unit can be configured to store a third constant array, and output respectively each row of data in the third constant array in sequence to the plurality of Q-data converting sub-units of the third data converting unit in each clock period; the data width and depth of the third constant array are arranged based on the number of the data converting sub-units, Q, and the data depth of the third constant array is, e.g., 1. In addition, the third data registering unit can be configured to register data, delivery the registered data from an input end to an output end at the rising edge or falling edge of each clock period, and output the data to a third data can convert a sub-unit in each clock period. Further, the plurality of Q-data converting sub-units can be configured to provide a data conversion processing in sequence in each clock period, and output the obtained conversion data to a next data converting sub-unit for subsequent processing, until completing the data conversion processing processes, the number of which can equal to the value of the depth, thereby obtaining a result of a second additional encryption and decryption data processing, which can serve as the final result of the encryption and decryption data processing.

According to a further exemplary embodiment of the present invention, the first constant array, the second constant array and the third constant array can provide the following:

(i) the data width and depth of the second constant array are arranged based on the number of the data converting sub-units, M, in the first additional encryption and decryption data processing device; the data width of the second constant array equals the product of the number of the data converting sub-units, M, in the first additional encryption and decryption data processing device and, e.g., 32; the data depth of the second constant array is, e.g., 1; and the product of the data width and depth of the second constant array is, e.g., M×32×1;

(ii) the data width and depth of the third constant array are arranged based on the number of the data converting sub-units, Q, in the second additional encryption and decryption data processing device; the data width of the third constant array equals the product of the number of the data converting sub-units, Q, in the second additional encryption and decryption data processing device and, e.g., 32; the data depth of the third constant array is, e.g., 1; and the product of the data width and depth of the third constant array is, e.g., Q×32×1; and (iii) the sum of the product of the data width and depth of the second constant array, e.g., M×32×1, the product of the data width and depth of the third constant array, e.g., Q×32×1, and the product of the data width and depth of the first constant array is, e.g., 1024.

For example, a second additional encryption and decryption data processing device can be provided. The device may include a third constant array storing unit, a third data registering unit and a third data converting unit, whereas the third data converting unit can include a plurality of Q-data converting sub-units. In particular, the third constant array storing unit can be configured to store a third constant array, and output respectively each row of data in the third constant array in sequence to the plurality of Q-data converting sub-units of the third data converting unit in each clock period. The third data registering unit can be configured to register data, deliver the registered data from an input end to an output end at the rising edge or falling edge of each clock period, and output the data to a third data converting sub-unit in each clock period. Further, the plurality of Q-data converting sub-units can be configured to make a data conversion processing in sequence in each clock period, and output the obtained conversion data to a next data converting sub-unit for subsequent processing, until completing the data conversion processing processes, the number of which can equal to the value of the depth, thereby obtaining a result of a second additional encryption and decryption data processing, which can serve as the final result of the encryption and decryption data processing.

According to yet a further exemplary embodiment of the present invention, the first constant array and the third constant array can provide the following:

(i) the data width and depth of the third constant array are arranged based on the number of the data converting sub-units, Q, in the second additional encryption and decryption data processing device; the data width of the third constant array equals the product of the number of the data converting sub-units, Q, in the second additional encryption and decryption data processing device and, e.g., 32; the data depth of the third constant array is, e.g., 1; and the product of the data width and depth of the third constant array is, e.g., Q×32×1; and (ii) the sum of the product of the data width and depth of the third constant array, e.g., Q×32×1, and the product of the data width and depth of the first constant array is, e.g., 1024.

In one exemplary embodiment of the method, system and computer-accessible medium of the present invention for encryption and decryption processing in SMS4 cryptographic procedure/algorithm, the repeating times of the data conversion processing can be reduced by arranging a constant array and providing a corresponding data converting sub-unit. The efficiency of encryption may be improved due to a large increase of data amount encrypted in unit time. For example, a final data processing result may be outputted by operating for, e.g., only 8 clock periods if, e.g., 4 data converting sub-units are employed for encrypting 128-bit data. Therefore, in the case of a same clock frequency, the efficiency of encryption is improved by, e.g., four times.

In another exemplary embodiment of the method, system and computer-accessible medium of the present invention, due to the implementation of the preferred encryption efficiency, the clock frequency can be only, e.g., 1/n of the one in the prior art. For example, the clock frequency can be only, e.g., ¼ of the one provided in the conventional systems and methods if, e.g., 4 data converting sub-units are employed for encrypting 128-bit data.

Further, in the case of the same processing efficiency, the exemplary embodiment of the design and implementation of the integrated circuit in the exemplary system can be easier; the integrity of signals can be largely optimized and the design cost is reduced. Furthermore, using the integrated circuit provided in the exemplary embodiment, the clock frequency can be only, e.g., 1/n of the one in the prior art in the case of meeting the required encryption efficiency. With the same processing efficiency, the PCB cost may be reduced, and the PCB design and the product can be easily achieved; the interference in the system is reduced, and the impacts on other equipments and devices are also decreased largely.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figure showing illustrative embodiment(s), result(s) and/or feature(s) of the exemplary embodiment(s) of the present invention, in which.

Throughout the figures, the same reference numerals and characters, unless otherwise stated, are used to denote like features, elements, components or portions of the illustrated embodiments. Moreover, while the present invention will now be described in detail with reference to the figures, it is done so in connection with the illustrative embodiments.

DETAILED DESCRIPTION OF EXEMPLARY EMBODIMENTS

Figure 1:
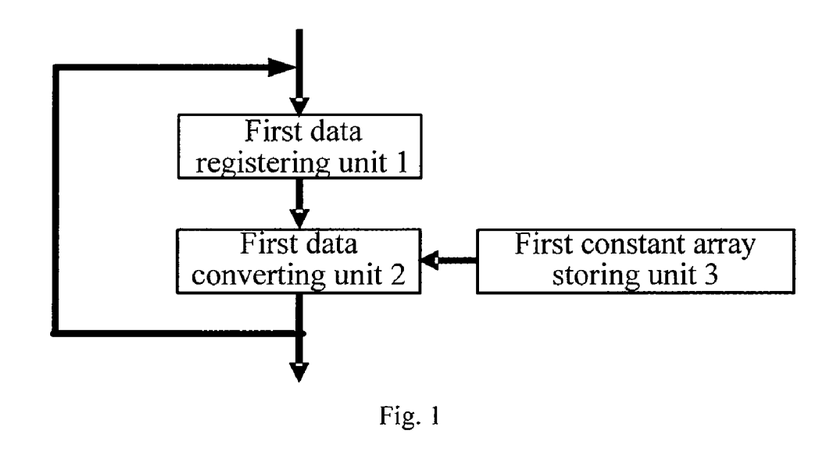
FIG. 1 is a schematic block diagram of a repeating encryption and decryption data processing according to a first exemplary embodiment of the present invention.

FIG. 1 is a schematic block diagram of a repeating encryption and decryption data processing according to a first exemplary embodiment of the present invention, which can include, e.g., a first data registering unit 1, a first constant array storing unit 3 and a first data converting unit 2.

For example, the first data registering unit 1 can be configured to register external data and a result of last data conversion processing. The first data registering unit 1 may generally use a general trigger, such as a D trigger, a JK trigger, etc. A general trigger is a data temporary storage component where the data of a data input end is transmitted to an output end of the trigger at the rising clock edge or falling clock edge, while the data of the trigger output end is unchanged at other time. In other words, in a same data conversion processing period, the data registered by the first data registering unit 1 can be unchanged.

The first data converting unit 2 can be configured to provide data processing according to the cryptographic procedure/algorithm requirement. For example, if making data processing according to the National SMS4 cryptographic procedure/algorithm, the operation completed by the first data converting unit 2 may simply include one conversion specified in the cryptographic algorithm.

The constant array storing unit 3 can be configured to store constant array data. The constant array employed in the first exemplary embodiment of the present invention can be the resultant data obtained upon key expansion processing, which may be arranged in a descending sequence of addresses. For example, the width and depth of the constant array may be arranged based on the number of the data converting sub-units included in the first data converting unit 2 in the cycling body, and the product of the width and depth is 1024. Further, for example, if 4 data converting sub-units are used, the width of the constant array may be 128 bits, and the depth can be 8. In addition, if 8 data converting sub-units are used, the width of the constant array can be 256 bits and the depth may be 4.

Referring to FIG. 1, the repeating encryption and decryption data processing in the first exemplary embodiment of the present invention can include the following:
  (i) arranging the data width and depth of a first constant array base on the number of the data converting sub-units, where data with a same depth are formed as one row, and storing the first constant array;
  (ii) outputting registered external data at the rising edge or falling edge of a first clock period;
  (iii) providing a data conversion processing for a first data in a first row of the stored first constant array with the registered external data in the first clock period to obtain a first conversion data of the first clock period;
  (iv) providing a data conversion processing for a second data in the first row of the stored first constant array with the first conversion data of the first clock period to obtain a second conversion data of the first clock period;
  (v) by analogy, providing a data conversion processing for all the rest data in the first row of the stored first constant array in sequence to obtain conversion-processing data of the first clock period;
  (vi) registering the conversion-processing data of the first clock period at the rising edge or falling edge of a second clock period;
  (vii) providing a data conversion processing for a first data in a second row of the stored first constant array with the registered first conversion-processing data in the second clock period to obtain a first conversion data of the second clock period;
  (viii) providing a data conversion processing for a second data in the second row of the stored first constant array with the first conversion data of the second clock period to obtain a second conversion data of the second clock period;
  (ix) by analogy, providing a data conversion processing for all the rest data in the second row of the stored first constant array in sequence to obtain conversion-processing data of the second clock period; and
  (x) repeating the above data conversion processing process until completing the data conversion processing processes, the number of which equals the value of the depth, thereby obtaining a result of the repeating encryption and decryption processing.

Figure 2:
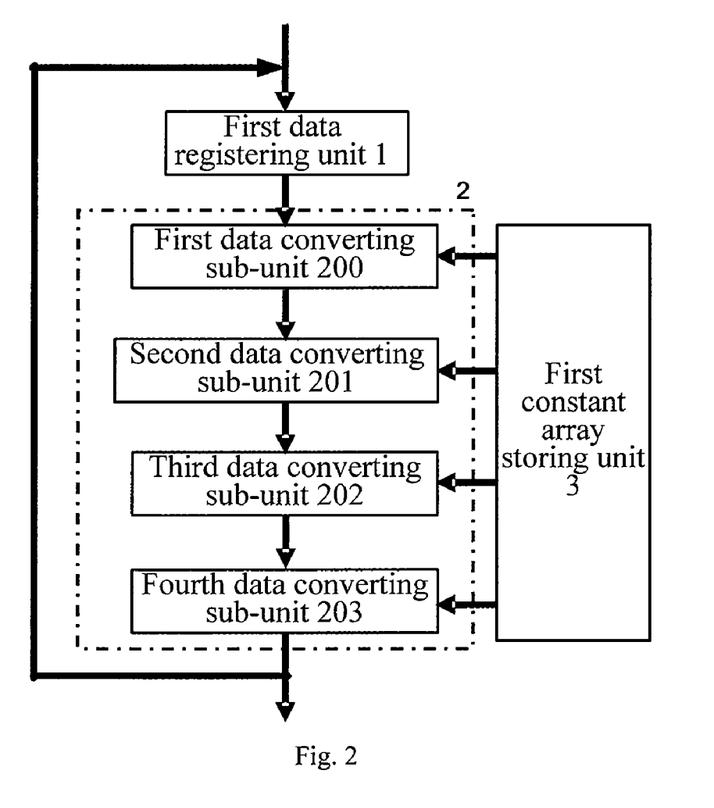
FIG. 2 is a schematic block diagram of the repeating encryption and decryption data processing according to a second exemplary embodiment of the present invention.

FIG. 2 shows a schematic block diagram of the repeating encryption and decryption data processing according to a second exemplary embodiment of the present invention. Such second exemplary embodiment can include a first data registering unit 1, a first constant array storing unit 3 and a first data converting unit 2. The first data converting unit 2 may include 4 data converting sub-units, e.g., a first data converting sub-unit 200, a second data converting sub-unit 201, a third data converting sub-unit 202, and a fourth data converting sub-unit 203. In the second exemplary embodiment of the present invention, the number of the data converting sub-units can be 4. When the number of the data converting sub-units is the divisor of, e.g., 32, the exemplary implementation with the repeating encryption and decryption data processing can be preferable, the processing process of which is similar to that of the second exemplary embodiment of the present invention.

Referring to FIG. 2, the repeating encryption and decryption data processing in the second exemplary embodiment of the present invention can include the following:
  (i) preparing a constant array;
  (ii) arranging data of a first constant array obtained upon key expansion processing in a descending sequence of addresses, and storing into the constant array storing unit 3;
  (iii) (2) arranging the width and depth based on the number of the data converting sub-units included in the data converting unit 2 in the data conversion processing, where the product of the width and depth is 1024; and
  (iv) forming the data with a same depth as one row in the first constant array.
  (v) inputting external data to the first data registering unit 1;
  (vi) inputting the external data to an input end of the first data registering unit 1;
  (vii) delivering the data from the input end of the first data registering unit 1 to its output end at the clock rising edge or clock falling edge;
  (viii) providing a first data conversion processing;

(ix) outputting the data of a first row in the first constant array stored in the first constant array storing unit 3 respectively to the data converting sub-units 200-203 in the first data converting unit 2 in the clock period;

(x) in the same clock period, inputting the data of the output end of the first data registering unit 1 into the first data converting sub-unit 200 for data conversion processing; inputting the data outputted from the first data converting sub-unit 200 into the next data converting sub-unit 201 for data conversion processing; by analogy, until all the data converting sub-units 200-203 in the data converting unit 2 complete the data conversion processing in sequence;

(xi) providing a second data conversion processing;

(xii) storing the data of the previous data conversion processing into the first data registering unit 1 at the time of a next clock edge;

(xiii) inputting the data of the next row in the first constant array stored in the first constant array storing unit 3 respectively to the data converting sub-units 200-203 in the first data converting unit 2 in the clock period;

(xiv) in the same clock period, inputting the data of the output end of the first data registering unit 1 into the first data converting sub-unit 200 for data conversion processing; inputting the data outputted from the first data converting sub-unit 200 into the next data converting sub-unit 201 for data conversion processing; by analogy, until all the data converting sub-units 200-203 in the data converting unit 2 complete the data conversion processing in sequence;

(xv) repeating the second data conversion processing;

(xvi) repeating the second data conversion processing until all the data conversion processing processes specified is completed, thus obtaining a result of the repeating encryption and decryption data processing.

The additional exemplary encryption and decryption data processing can be utilized for complementarily implementing the data conversion processing which may not be completed by the repeating encryption and decryption data processing, e.g., in the case that the number of the data converting sub-units included in the first data converting unit 2 is not the divisor of, e.g., 32, the repeating encryption and decryption data processing and the additional encryption and decryption data processing may be combined for implementing the data conversion processing. Hereinafter, the third to fifth exemplary embodiments are illustrated particularly for explaining such concept.

Figure 3:
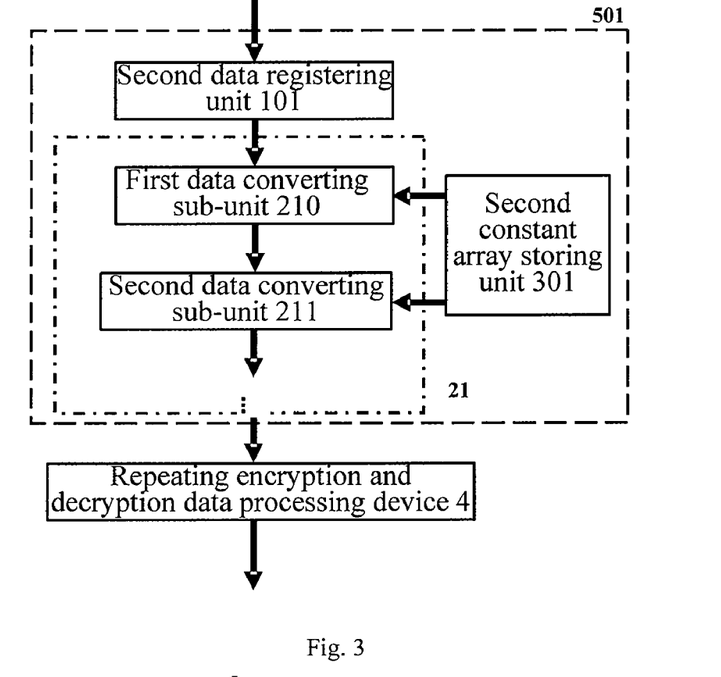
FIG. 3 is a schematic block diagram of an additional encryption and decryption data processing operations and arrangements provided before the repeating encryption and decryption data processing according to a third exemplary embodiment of the present invention.

FIG. 3 is a schematic diagram of an additional encryption and decryption data processing provided before the repeating encryption and decryption data processing according to a third exemplary embodiment of the present invention. Such third exemplary embodiment can include a first additional encryption and decryption data processing device 501 and a repeating encryption and decryption data processing device 4. The exemplary components of the repeating encryption and decryption data processing device 4 may be the same as those in the second exemplary embodiment of the present invention; the first additional encryption and decryption data processing device 501 can include a second data register 101, a second constant array storing unit 301 and a second data converting unit 21, whereas the second data converting unit 21 may include a first data converting sub-unit 210, a second data converting sub-unit 211, etc.

Referring to FIG. 3, the additional encryption and decryption data processing provided before the repeating encryption and decryption data processing may include:

(i) preparing a constant array;

(ii) arranging data of a second constant array obtained upon key expansion processing in a descending sequence of addresses, and storing into the second constant array storing unit 301;

(iii) a) determining the width and depth of the first constant array in the repeating encryption and decryption data processing; and arranging the width and depth based on the number of the data converting sub-units, N, included in the first data converting unit 2 in the repeating encryption and decryption data processing, thereby obtaining the product of the data width and depth of the first constant array in the repeating encryption and decryption data processing;

b) determining the width and depth of the second constant array in the additional encryption and decryption data processing; arranging the width and depth based on the number of the data converting sub-units included in the second data converting unit 21 in the additional encryption and decryption data processing, where the data width of the second constant array equals the product of the number of the data converting sub-units, M, in the additional encryption and decryption data processing and, e.g., 32, and the data depth of the constant array in the additional encryption and decryption data processing is, e.g., 1; and determining the product of the data width and depth of the second constant array in the additional encryption and decryption data processing as the number of the data converting sub-units in the additional encryption and decryption data processing, e.g., M×32×1;

(iv) the data of the second constant array in the additional encryption and decryption data processing should meet the conditions that, the sum of the product of the data width and depth of the first constant array in the repeating encryption and decryption data processing and the product of the data width and depth of the second constant array, e.g., M×32×1, in the additional encryption and decryption data processing is, e.g., 1024;

(v) forming the data with a same depth in the first and second constant array as one row;

(vi) inputting external data into the second data registering unit 101; inputting the external data to an input end of the second data registering unit 101; delivering the data from the input end of the second data registering unit 101 to its output end at the clock rising edge or clock falling edge; and providing an additional data conversion processing;

(vii) (1) outputting the data of the second constant array stored in the second constant array storing unit 301 respectively to the data converting sub-units 210, 211 and the like in the second data converting unit 21 in the clock period; (2) in the same clock period, inputting the data of the output end of the second data registering unit 101 into the first data converting sub-unit 210 for data conversion processing; inputting the data outputted from the first data converting sub-unit 210 into the next data converting sub-unit 211 for data conversion processing; (3) by analogy, until all the data converting sub-units 210, 211 and the like in the second data converting unit 21 complete the data conversion processing in sequence, thereby obtaining the data processing result of the first additional encryption and decryption data processing device 501; and (4) using the data processing result from the first additional encryption and decryption data processing device 501 as the external data in the repeating encryption and decryption data processing device 4, thereby completing the repeating encryption and decryption data processing.

Figure 4:
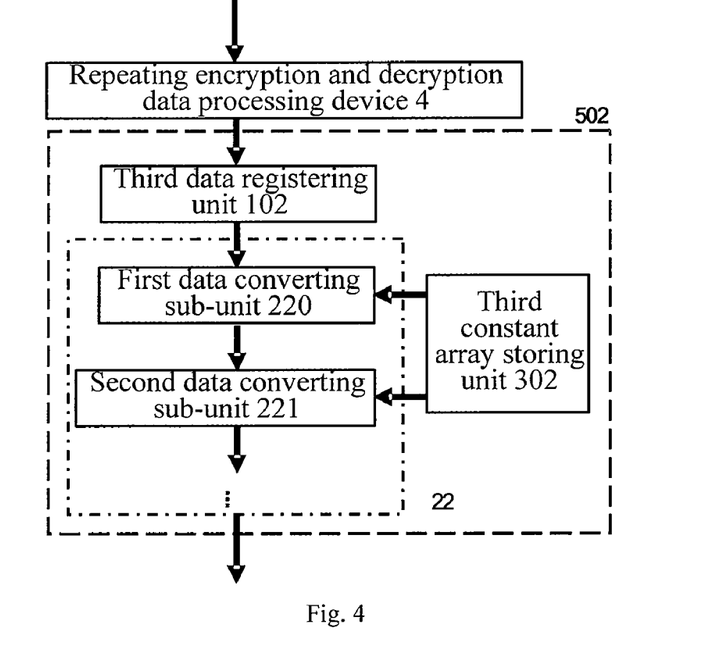
FIG. 4 is a schematic block diagram of an additional encryption and decryption data processing operations and arrangements provided after the repeating encryption and decryption data processing according to a fourth exemplary embodiment of the present invention.

FIG. 4 is a schematic diagram of an additional encryption and decryption data processing operations and arrangements provided after the repeating encryption and decryption data processing according to a fourth exemplary embodiment of the present invention. Such fourth exemplary embodiment can include a repeating encryption and decryption data processing device 4 and a second additional encryption and decryption data processing device 502. The exemplary components of the repeating encryption and decryption data processing device 4 may be the same as those in the second exemplary embodiment of the present invention. For example, the second additional encryption and decryption data processing device 502 may include a third data register 102, a third constant array storing unit 302 and a third data converting unit 22, where the third data converting unit 22 includes a first data converting sub-unit 220 and a second data converting sub-unit 221, etc.

Referring to FIG. 4, the additional encryption and decryption data processing provided after the repeating encryption and decryption data processing may include the following:

(i) preparing a constant array;

(ii) arranging data of a first constant array obtained upon the repeating encryption and decryption data processing in a descending sequence of addresses, and storing into the first constant array storing unit 3;

(iii) (a) determining the width and depth of the first constant array in the repeating encryption and decryption data processing, and arranging the width and depth based on the number of the data converting sub-units, N, included in the data converting unit 2 in the repeating encryption and decryption data processing, thereby obtaining the product of the data width and depth of the first constant array in the repeating encryption and decryption data processing; and (b) determining the data width and depth of the third constant array in the additional encryption and decryption data processing;

(iv) based upon that the data width of the third constant array in the additional encryption and decryption data processing equals the product of the number of the data converting sub-units, Q, in the additional encryption and decryption data processing and 32, and the data depth of the third constant array in the additional encryption and decryption data processing is 1;

(v) determining the product of the data width and depth of the third constant array in the additional encryption and decryption data processing to be, e.g., Q×32×1, the data of the third constant array in the additional encryption and decryption data processing should meet the conditions that, and the sum of the product of the data width and depth of the first constant array in the repeating encryption and decryption data processing and the product of the data width and depth of the third constant array, e.g., Q×32×1, in the additional encryption and decryption data processing is, e.g., 1024;

(vi) forming the data with a same depth in the constant array as one row;

(vii) inputting data obtained from the repeating encryption and decryption data processing device 4 into the third data registering unit 102;

(viii) inputting the data obtained from the repeating encryption and decryption data processing device 4 to an input end of the third data registering unit 102;

(ix) delivering the data from the input end of the third data registering unit 102 to its output end at the clock rising edge or clock falling edge;

(x) providing an additional data conversion processing;

(xi) outputting the data of the third constant array stored in the third constant array storing unit 302 respectively to the data converting sub-units 222, 221 and the like in the third data converting unit 22 in the clock period;

(xii) in the same clock period, inputting the data of the output end of the third data registering unit 102 into the first data converting sub-unit 220 for data conversion processing; inputting the data outputted from the first data converting sub-unit 220 into the next data converting sub-unit 221 for data conversion processing; by analogy, until all the data converting sub-units 220, 221 and the like in the third data converting unit 22 complete the data conversion processing in sequence, thereby obtaining the data processing result of the second additional encryption and decryption data processing device 502; and (xiii) using the data processing result of the second additional encryption and decryption data processing device 502 as the final encryption and decryption data processing result.

Figure 5:
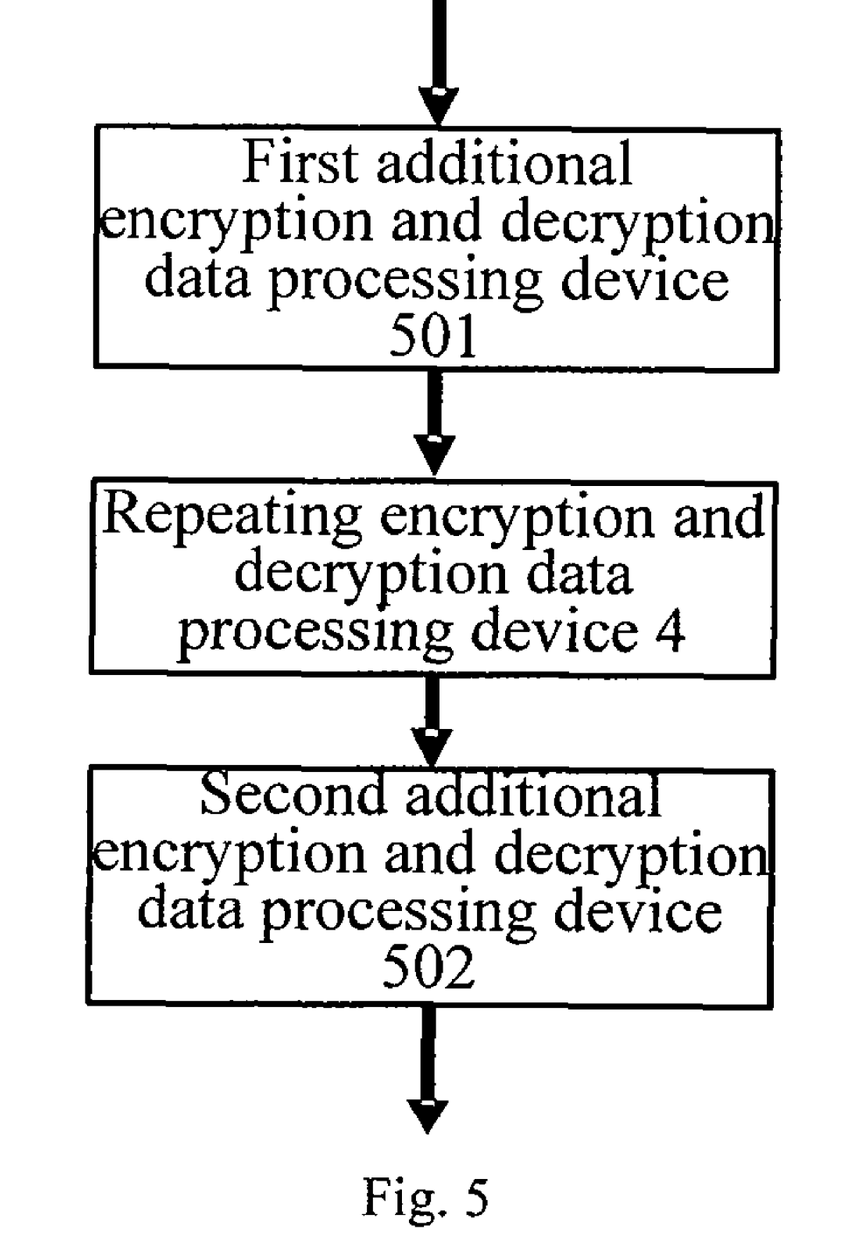
FIG. 5 is a schematic block diagram of an additional encryption and decryption data processing operations and arrangements provided both before and after the repeating encryption and decryption data processing according to a fifth exemplary embodiment of the present invention.

The additional encryption and decryption data processing may be performed before or after the repeating encryption and decryption data processing or both. FIG. 5 is a schematic block diagram of an additional encryption and decryption data processing operations and arrangements provided both before and after the repeating encryption and decryption data processing according to a fifth exemplary embodiment of the present invention, including a first additional encryption and decryption data processing device 501, a repeating encryption and decryption data processing device 4 and a second additional encryption and decryption data processing device 502. When necessary, each of the first and the second additional encryption and decryption data processing devices may include one or more data converting sub-units.

Referring to FIG. 2, in the sixth exemplary embodiment of the present invention, the data converting unit 2 includes four data converting sub-units, e.g., a first data converting sub-unit 200, a second data converting sub-unit 201, a third data converting sub-unit 202 and a fourth data converting sub-unit 203. The width of a first constant array can be 128 bits, and the depth may be, e.g., 8. A repeating encryption and decryption data processing is used for the encryption and decryption processing, which can include the following:

(i) preparing a first constant array;

(ii) storing the first constant array into a first constant array storing unit 3, the width of the first constant array being 128 bits, and the depth being 8 since four data converting sub-units can be included in the data conversion processing;

(iii) dividing the data of the first constant array with the width of 128-bit into 8 rows by the depth of 8 where each row is respectively named as rk0, rk1, . . . , rk7; dividing each row of 128-bit data in the first constant array into four data blocks with each being 32-bit, i.e. rk0 being divided into rk0a, rk0b, rk0c and rk0d; rk1 being divided into rk1a, rk1b, rk1c and rk1d, etc.;

(iv) inputting external data to the first data registering unit 1;

(v) inputting the external data to an input end of the first data registering unit 1, where the external data is data of 128 bits, which is divided into 4 data blocks with each including, e.g., 32 bits and named respectively as A0, A1, A2 and A3;

(vi) delivering the data from the input end of the first data registering unit 1 to its output end at the clock rising edge or clock falling edge, where the first data registering unit 1 can output the 128-bit data which may be divided into 4 data blocks with each including, e.g., 32 bits and named respectively as a0, a1, a2 and a3;

(vii) providing a first data conversion processing;

(viii) outputting the data of a first row in the first constant array stored in the first constant array storing unit 3 respectively to the data converting sub-units 200-203 in the clock period;

(ix) in the same clock period, inputting the data of the output end of the first data registering unit 1 into the first data converting sub-unit 200 for data conversion processing; inputting the data outputted from the first data converting sub-unit 200 into the next data converting sub-unit 201 for data conversion processing; by analogy, until all the data converting sub-units, i.e. the data converting sub-units 200-203 complete the data conversion processing in sequence; for example, sending the data a0, a1, a2 and a3 from the output end of the first data register unit 1, and the data, rk0a, outputted from the first constant array storing unit 3 to the first data converting sub-unit 200 for data conversion processing, and the data upon the conversion processing are still 128 bits and named respectively as B0, B1, B2 and B3;

(x) sending the data B0, B1, B2 and B3 outputted from the first data converting sub-unit 200, and the data, rk0b, outputted from the first constant array storing unit 3 to the second data converting sub-unit 201 for data conversion processing, and the data upon the conversion processing are still 128 bits and named respectively as C0, C1, C2 and C3;

(xi) sending the data C0, C1, C2 and C3 outputted from the second data converting sub-unit 201, and the data, rk0c, outputted from the first constant array storing unit 3 to the third data converting sub-unit 202 for data conversion processing, and the data upon the conversion processing are still 128 bits and named respectively as D0, D1, D2 and D3;

(xii) sending the data D0, D1, D2 and D3 outputted from the third data converting sub-unit 202, and the data, rk0d, outputted from the first constant array storing unit 3 to the fourth data converting sub-unit 203 for data conversion processing, and the data upon the conversion processing are still 128 bits and named respectively as E0, E1, E2 and E3; i.e. E0, E1, E2 and E3 are the resultant data of data conversion processing of the first time;

(xiii) providing a second data conversion processing;

(xiv) storing the data of the previous data conversion processing E0, E1, E2 and E3 into the first data registering unit 1, and inputting the data e0, e1, e2 and e3 from the output end of the first data registering unit 1 to the data converting sub-units 200-203 in sequence at the time of a clock edge;

(xv) inputting the data rk1a, rk1b, rk1c and rk1d of the next row in the first constant array stored in the first constant array storing unit 3 respectively to the data converting sub-units 200-203;

(xvi) providing the second conversion processing; and (xvii) repeating the second data conversion processing, thus obtaining the encryption and decryption data processing result.

One exemplary data conversion processing period can be completed every time the second data conversion processing is made. If the second data conversion processing is repeated for six times, e.g., the data conversion processing may be made for 8 times in all, the data outputted upon last data conversion processing is the final data processing result.

If the data conversion data 2 includes 2 data converting sub-units, the repeating encryption and decryption data processing can be provided for 16 clock periods to complete one encryption and decryption processing; if the data conversion data 2 includes 8 data converting sub-units, the repeating encryption and decryption data processing is made for 4 clock periods to complete one encryption and decryption processing; if the data conversion data 2 includes 16 data converting sub-units, the repeating encryption and decryption data processing is made for 2 clock periods to complete one encryption and decryption processing.

In the method for encryption and decryption processing in SMS4 cryptographic algorithm according to the exemplary embodiments of the present invention, the repeating times of the data conversion processing can be reduced by arranging a constant array and providing a corresponding data converting sub-unit. The efficiency of encryption can be improved due to a large increase of data amount encrypted in unit time. For example, a final data processing result may be outputted by operating for 8 clock periods if 4 data converting sub-units are employed for encrypting 128-bit data. Therefore, in the case of a same clock frequency, the efficiency of encryption is improved by, e.g., four times.

In the system for encryption and decryption processing in SMS4 cryptographic algorithm according to the exemplary embodiments of the present invention, due to meeting the preferred encryption efficiency, the clock frequency can be only 1/n of the one in the prior art. For example, the clock frequency in only ¼ of the one in the prior art if 4 data converting sub-units are employed for encrypting 128-bit data.

Further, in the case of the same processing efficiency, the design and implementation of the integrated circuit in the solution of the exemplary embodiments of the present invention can be easier; the integrity of signals may be largely optimized and the design cost is reduced. Furthermore, using the integrated circuit designed in the exemplary embodiments of the present invention, the clock frequency may be, e.g., only 1/n of the one in the prior art in the case of meeting the required encryption efficiency. With the same or similar processing efficiency, the PCB cost may be reduced, and the PCB design and the product are easily achieved; the interference in the system can be reduced, and the impacts on other equipments and devices may be also decreased largely.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements, media and methods which, although not explicitly shown or described herein, embody the principles of the invention and are thus within the spirit and scope of the present invention. In addition, all publications referenced herein above are incorporated herein by reference in their entireties.

What is claimed is:

1. A method for an encryption and decryption processing in SMS4 cryptographic procedure, in which a repeating encryption and decryption data processing procedure is comprised, the procedure comprising:

arranging a data width and a data depth of a first constant array and storing the first constant array;

outputting registered external data at least one of a rising edge or a falling edge of a first clock period;

providing a first data conversion processing procedure for first data in a first row of the stored first constant array with the registered external data in the first clock period to obtain first conversion data of the first clock period;

providing a second data conversion processing procedure for a second data in the first row of the stored first constant array with the first conversion data of the first clock period to obtain a second conversion data of the first clock period;

providing a third data conversion processing procedure for all remaining data in the first row of the stored first constant array in a sequence to obtain conversion-processing remaining data of the first clock period;

registering the conversion-processing data of the first clock period at least one of a rising edge or a falling edge of a second clock period;

providing a fourth data conversion processing procedure for first data in a second row of the stored first constant array with the registered conversion-processing remaining data of the first clock period in the second clock period to obtain first conversion data of the second clock period;

providing a fifth data conversion processing procedure for a second data in the second row of the stored first constant array with the first conversion data of the second clock period to obtain second conversion data of the second clock period;

providing a sixth data conversion processing procedure for remaining data in the second row of the stored first constant array in a sequence to obtain a conversion-processing remaining data of the second clock period; and repeating at least one of the first through third data conversion processing procedures or the fourth through sixth data conversion processing procedures for remaining rows of the first constant array until a completion of the repeating data conversion processing procedure, wherein a particular number of the at least one of the first through third or the fourth through sixth data conversion processing procedures during the repeating data conversion processing procedure being the value of the data depth so as to obtain a result of the repeating encryption and decryption processing procedure.

2. The method according to claim 1, wherein the first constant array includes data arranged in a descending sequence of addresses and stored thereafter, wherein the data width and the data depth of the first constant array are arranged based on the particular number, and wherein the product of the data width and the data depth is 1024.

3. The method according to claim 1, further comprising, before the repeating procedure, providing a first additional encryption and decryption data processing procedure which includes:

arranging a data width of a second constant array according to a particular number of data conversion processing procedures during the first additional encryption and decryption data processing procedure, wherein the data depth of the second constant array being 1, and storing the second constant array;

outputting the registered external data at least one of a rising edge or a falling edge of the clock period;

providing a seventh data conversion processing procedure for a first data in the stored second constant array with the registered external data in the clock period to obtain a first conversion data;

providing an eighth data conversion processing procedure for a second data in the stored second constant array with the first conversion data to obtain a second conversion data; and providing a ninth data conversion processing procedure for all the remaining data in the stored second constant array in a sequence to obtain a result of a first additional encryption and decryption data processing procedure; and providing the result of the first additional encryption and decryption data processing procedure serve as the external data in the repeating encryption and decryption data processing procedure.

4. The method according to claim 3, wherein the first constant array and the second constant array provides the following:

the data width of the second constant array equals to the product of the particular number of data conversion processing procedures of the first additional encryption and decryption data processing procedure and 32;

the data depth of the second constant array is 1;

the product of the data width and the depth of the second constant array is determined; and a sum of the product of the data width and the depth of the second constant array and the product of the data width and the data depth of the first constant array is 1024, and further comprising, after the repeating procedure, providing a second additional encryption and decryption data processing procedure which includes:

arranging the data width of a third constant array according to a particular number of the data conversion processing procedures during the second additional encryption and decryption data processing procedure, the data depth of the third constant array being 1 and the third constant array being stored;

registering the result of the repeating procedure, and outputting the registered data at least one of the rising edge or the falling edge of the clock period;

providing a tenth data conversion processing for a first data in the stored third constant array with the registered external data in the clock period to obtain a first conversion data;

providing an eleventh data conversion processing procedure for a second data in the stored third constant array with the first conversion data to obtain a second conversion data; and providing a twelfth data conversion processing procedure for the remaining data in the stored third constant array in a sequence to obtain a result of the second additional encryption and decryption data processing procedure which serves as a final encryption and decryption data processing result.

5. The method according to claim 4, wherein the first constant array, the second constant array and the third constant array provide the following:

the data width of the second constant array equals the product of the particular number of data conversion processing procedures of the first additional encryption and decryption data processing procedure and 32, the data depth of the second constant array is 1, and the product of the data width and depth of the second constant array is determined, the data width of the third constant array equals the product of the particular number of data conversion processing procedures of the second additional encryption and decryption data processing procedure and 32, the data depth of the third constant array is 1, and the product of the data width and the data depth of the third constant array is determined, and a sum of the product of the data width and the data depth of the second constant array, a product of the data width and the data depth of the third constant array, and a product of the data width and the data depth of the first constant array is 1024.

6. The method according to claim 1, further comprising, after the repeating procedure, providing a second additional encryption and decryption data processing procedure which includes:

arranging the data width of a third constant array according to a particular number of data conversion processing procedures of the second additional encryption and decryption data processing procedure, wherein the data depth of the third constant array is 1, and the third constant array is stored;

registering the result of the repeating procedure, and outputting the registered data at least one of the rising edge or the falling edge of the clock period;

providing a first further data conversion processing procedure for first data in the stored third constant array with the registered external data in the clock period to obtain a first conversion data;

providing a second further data conversion processing procedure for a second data in the stored third constant array with the first conversion data to obtain a second conversion data; and providing a third further data conversion processing procedure for the remaining data in the stored third constant array in sequence in the second additional encryption and decryption data processing procedure to obtain a result of the second additional encryption and decryption data processing procedure which serves as a final encryption and decryption data processing result.

7. The method according to claim 6, wherein the first constant array and the third constant array provide the following:

the data width of the third constant array equals a product of the particular number of data conversion processing procedures of the second additional encryption and decryption data processing procedure and 32, the data depth of the third constant array is 1, and the product of the data width and the depth of the third constant array is determined; and a sum of the product of the data width and the data depth of the third constant array and the product of the data width and depth of the first constant array is 1024.

8. A non-transitory computer accessible medium which includes software thereon for an encryption and decryption processing in SMS4 cryptographic procedure, in which a repeating encryption and decryption data processing procedure is comprised, wherein, when a processor accesses and executes the software, the processor is configured to perform procedures comprising:

arranging a data width and a data depth of a first constant array and storing the first constant array;

outputting registered external data at least one of a rising edge or a falling edge of a first clock period;

providing a first data conversion processing procedure for first data in a first row of the stored first constant array with the registered external data in the first clock period to obtain first conversion data of the first clock period;

providing a second data conversion processing procedure for a second data in the first row of the stored first constant array with the first conversion data of the first clock period to obtain a second conversion data of the first clock period;

providing a third data conversion processing procedure for all remaining data in the first row of the stored first constant array in a sequence to obtain conversion-processing remaining data of the first clock period;

registering the conversion-processing data of the first clock period at least one of a rising edge or a falling edge of a second clock period;

providing a fourth data conversion processing procedure for first data in a second row of the stored first constant array with the registered conversion-processing remaining data of the first clock period in the second clock period to obtain first conversion data of the second clock period;

providing a fifth data conversion processing procedure for a second data in the second row of the stored first constant array with the first conversion data of the second clock period to obtain second conversion data of the second clock period;

providing a sixth data conversion processing procedure for remaining data in the second row of the stored first constant array in a sequence to obtain a conversion-processing remaining data of the second clock period; and repeating at least one of the first through third data conversion processing procedures or the fourth through sixth data conversion processing procedures for remaining rows of the first constant array until a completion of the first through fifth data conversion processing procedures, wherein a particular number of the at least one of the first through third or the fourth through sixth data conversion processing procedures during the repeating data conversion processing procedures being the value of the data depth so as to obtain a result of the repeating encryption and decryption processing procedure.

* * * * *